United States Patent
Kuwahara et al.

(10) Patent No.: US 11,143,312 B2
(45) Date of Patent: Oct. 12, 2021

(54) ECCENTRIC ROTARY VALVE

(71) Applicant: KURIMOTO, LTD., Osaka (JP)

(72) Inventors: Takashi Kuwahara, Osaka (JP); Hidemitsu Mamoto, Osaka (JP)

(73) Assignee: Kurimoto, Ltd., Osaka (JP)

( * ) Notice: Subject to any disclaimer, the term of this patent is extended or adjusted under 35 U.S.C. 154(b) by 46 days.

(21) Appl. No.: 16/804,663

(22) Filed: Feb. 28, 2020

(65) Prior Publication Data

US 2020/0284357 A1    Sep. 10, 2020

(30) Foreign Application Priority Data

Mar. 5, 2019   (JP) .............. JP2019-039660

(51) Int. Cl.
*F16K 5/20* (2006.01)
*F16K 5/06* (2006.01)
*F16K 5/04* (2006.01)

(52) U.S. Cl.
CPC .......... *F16K 5/0407* (2013.01); *F16K 5/0605* (2013.01); *F16K 5/204* (2013.01)

(58) Field of Classification Search
CPC . F16K 5/06; F16K 5/0605; F16K 5/20; F16K 5/204
See application file for complete search history.

(56) References Cited

U.S. PATENT DOCUMENTS 6,485,000 B1   11/2002   Klyde et al.

FOREIGN PATENT DOCUMENTS

| JP | 59-750 | 1/1984 |
|---|---|---|
| JP | 2002-538386 | 11/2002 |
| JP | 2018-173122 | 11/2018 |
| WO | 00/50792 | 8/2000 |

*Primary Examiner* — Hailey K. Do (74) *Attorney, Agent, or Firm* — Wenderoth, Lind & Ponack, L.L.P.

(57) ABSTRACT

An eccentric rotary valve includes valve elements arranged symmetrically around the valve shaft axis, and valve element valve seats and valve body valve seats which are elliptic conical surfaces made of metal. Each valve element has an elliptic spherical surface, an elliptic conical surface, or a completely spherical surface to which one of the valve element valve seats is continuously and steplessly connected. The axes of the valve seats are offset from the valve shaft axis in the valve closing direction such that, when the valve shaft is rotated in the valve opening direction, the valve element valve seats instantly separate from the valve body valve seats. Flow regulating plates are disposed in the valve body between the valve elements to ensure smooth flow of fluid. Ribs are disposed on opposite sides of the valve shaft and forwardly, in the valve opening direction, of the respective valve elements.

20 Claims, 6 Drawing Sheets

ECCENTRIC ROTARY VALVE

CROSS REFERENCE TO RELATED APPLICATIONS

This application is based on and claims priority under 35 U.S.C. sctn. 119 with respect to Japanese Patent Application No. 2019-039660 filed on Mar. 5, 2019, the entire content of which is incorporated herein by reference.

BACKGROUND OF THE INVENTION

The present invention relates to an eccentric rotary valve used as a shutoff valve or a flow control valve in instrumentation facilities of e.g., waterworks systems and oil or chemical plants, in power generation facilities, and in piping systems for transporting fluid such as industrial water, water in hydroelectric generation facilities, and gases.

A conventional conical plug valve (as shown in JP S59-750B, which is hereinafter referred to as "Patent Document 1") includes two valve elements on opposite sides of a valve shaft in the axial direction of a tubular valve body to define between the valve elements a through-passage configured to communicate with a fluid inlet and a fluid outlet of the valve body, and further includes valve element valve seats and valve body valve seats which are also disposed on opposite sides of the valve shaft in the axial direction of the valve body.

By rotating the valve shaft of this type of valves about its axis, the valve element valve seats are brought into or out of contact with the valve body valve seats, thereby closing or opening the fluid inlet and outlet.

JP2002-538386A (WO00/50792; hereinafter referred to as "Patent Document 2") discloses a ball valve including a tubular valve body through which fluid flows, and a valve shaft inserted in the valve body. The valve shaft carries a pair of valve elements that are symmetric to each other with respect to the center axis of the valve shaft, and defines therebetween a through-passage (bore) that communicates with a fluid inlet and a fluid outlet of the valve body. The valve body and the valve elements have valve seats in the form of e.g., elliptic conical surfaces of which the center axes are offset from the center axis of the valve shaft in the valve closing direction.

Since this ball valve closes both the fluid inlet and fluid outlet, the valve can be reliably closed (as described in paragraph 0001 of Patent Document 2). Also, paragraph 0014 of Patent Document 2 explains that since the valve element valve seats are curved surfaces having a different radius of curvature from that of the valve body valve seats, the valve closing torque is large, so that the valve can be reliably kept closed.

JP2018-173122A (hereinafter referred to as "Patent Document 3) discloses, as another eccentric rotary valve, a triply eccentric rotary valve, which includes a tubular valve body through which fluid flows, and a valve shaft inserted in the valve body and having a center axis offset from the center axis of the valve body. The valve shaft carries a valve element offset from the valve shaft (i.e., the center axis of the valve element is offset from the center axis of the valve shaft). The valve element has a valve seat made of a metal sheet of which the center axis is inclined relative to the center axis of the valve body. The valve body has a valve seat made of a metal sheet with which the valve seat of the valve element is brought into and out of contact.

Patent Document 3 explains that in this triply eccentric rotary valve, since the seal surfaces of the valve element valve seat and the valve body valve seat do not slide against each other during opening and closing of the valve, the valve maintains its seal performance for a long period of time, and thus sufficiently durable, and also, it is possible to minimize jumping phenomena which tend to occur when the valve is opened.

In the conventional conical plug valve shown in Patent Document 1, if the valve body has a relatively large diameter, the sliding areas between the valve element valve seats and the valve body valve seats are large, and also a large pressure is applied to the valve seats if the valve is used under high pressure. Thus, it is difficult to smoothly open the valve from its completely closed position due to the slide resistance. Therefore, it is necessary to raise the valve elements before turning them to reduce the slide resistance between the valve seats. For this purpose, a complicated and expensive structure for turning the valve shaft is necessary.

While the ball valve disclosed in Patent Document 2 is closed, positive pressure from the fluid inlet and outlet of the valve body and positive pressure inside the valve body are applied to the valve elements to stably maintain the closed position (see paragraph 0029 of Patent Document 2).

For this purpose, the members forming the valve element valve seats and the valve body valve seats are cylindrical, and Patent Document 2 explains that either the valve element valve seats or the valve body valve elements are preferably made of an elastic material (paragraph 0015 of Patent Document 2). The elastic valve seats may pose problems regarding durability.

The eccentric rotary valve disclosed in Patent Document 3 is such that only the fluid inlet of the valve body is opened and closed, so that the valve cannot be reliably maintained in the closed position.

SUMMARY OF THE INVENTION

An object of the present invention is to provide a rotary valve which can be reliably opened and closed without, as with the above-described conical plug valve, the need to raise the valve elements beforehand, and is thus durable.

The eccentric rotary valve according to the present invention, which achieves the above object, includes a valve body which is tubular in shape and through which fluid can flow. The valve body has a fluid inlet and a fluid outlet. A valve shaft is inserted in the valve body and has a center axis. A first valve element and a second valve element are disposed on the valve shaft so as to be symmetrical to each other with respect to the center axis of the valve shaft and so as to define therebetween a through-passage configured to communicate with the fluid inlet and the fluid outlet of the valve body. A first valve body valve seat and a second valve body valve seat are disposed in the valve body adjacent to the fluid inlet and the fluid outlet, respectively. A first valve element valve seat and a second valve element valve seat are disposed, respectively, on the first and second valve elements, and configured to abut, respectively, the first and second valve body valve seats.

Since the fluid inlet and fluid outlet of the valve body are closed by bringing the first and second valve element valve seats into abutment with the first and second valve body valve seats at the fluid inlet and fluid outlet of the valve body, the valve can be closed reliably.

Each of the first and second valve elements has a surface selected from an elliptic spherical surface, an elliptic conical surface, and a completely spherical surface. The first and second valve element valve seats and the first and second valve body valve seats are elliptic spherical surfaces made of metal and forming a metal seal structure. The first and second valve element valve seats are continuously and steplessly connected, respectively, to the surfaces of the first and second valve elements. The first and second valve element valve seats and the first and second valve body valve seats have center axes, respectively, that are offset from the center axis of the valve shaft in a valve closing direction.

Since the valve elements have elliptic spherical surfaces, elliptic conical surfaces, or completely spherical surfaces, and the valve element valve seats are continuously and steplessly connected to the respective valve element surfaces, fluid flows smoothly along the surfaces of the valve elements and the valve element valve seats following a curved pattern.

As used herein, the terms "elliptic spherical surface" and "elliptic conical surface" each refer to a surface having an elliptic cross-section along a plane perpendicular to the axis of such a surface. As used herein, the expression "valve seats have center axes offset from the center axis of the valve shaft in the valve closing direction" or similar expressions mean that the center axes of the valve seats are inclined at predetermined angles relative to the center axis of the valve body in the valve closing direction so as not to cross the center axis of the valve shaft.

Since the valve seats are made of metal and form a metal seal structure (which means that metal surfaces abut each other to provide a seal), the valve seats according to the present invention are durable compared with valve seats made of an elastic material, and the valve can be closed with high torque and thus reliably.

Since the center axes of the valve element valve seats and the valve body valve seats are both inclined at predetermined angles in the valve closing direction, when, with the eccentric rotary valve closed, the valve shaft is turned in the valve opening direction, the valve element valve seats instantly separate from the valve body valve seats, and their seal surfaces do not slide against each other. Thus, it is not necessary to raise the valve elements beforehand.

The eccentric rotary valve may further include a flow regulating plate disposed between the valve elements and extending in the fluid flow direction in the through-passage so as to ensure smooth flow of fluid through the through-passage.

In a preferred arrangement, a pair of ribs are disposed on opposite sides of the valve shaft at locations forwardly, in the valve opening direction with the eccentric rotary valve closed, of the respective valve elements so as to extend between valve shaft mounting portions to which the valve shaft is mounted and so as to be adjacent, with the eccentric rotary valve open, to the respective valve body valve seats. Grooves are formed in the surfaces of the ribs. With this arrangement, with the valve in the open position, the ribs are located close to the respective valve body valve seats, and the grooves of the ribs block the flow of fluid, thereby reducing the amount of fluid flowing from the fluid inlet toward the fluid outlet through the space around the valve elements, which in turn allows a larger amount of fluid to smoothly flow through the through-hole.

In one arrangement, the valve element valve seats and the valve body valve seats are both elliptic spherical surfaces. In another arrangement, the valve element valve seats are elliptic spherical surfaces, while the valve body valve seats are elliptic conical surfaces. In still another arrangement, the valve element valve seats and the valve body valve seats are both elliptic conical surfaces.

In any of these arrangements, the center axes of the valve body valve seats and the valve element valve seats may be inclined, with the eccentric rotary valve closed, at predetermined angles relative to the center axis of the (tubular) valve body such that the valve body valve seats are in contact with the corresponding valve element valve seats along complete circles that lie on planes perpendicular to the center axis of the valve body. In other words, the inclination angle of the center axis of each valve seat may be determined such that, with the eccentric rotary valve closed, the (elliptic spherical or elliptic conical) valve seat has a completely circular cross section along a plane perpendicular to the center axis of the valve body. With this arrangement, if the eccentric rotary valve according to the present invention is used in a substantially completely cylindrical pipe of which the fluid flow passage has a substantially completely circular cross-section, since the fluid inlet and the fluid outlet of the eccentric rotary valve also have a completely circular cross-section, pressure loss never occurs when fluid enters and leaves the eccentric rotary valve, and fluid can stably flows through the eccentric rotary valve. As used herein, the term "completely circular" or "complete circle(s)" refers not only to a circle or circles of which the diameter is completely uniform around the entire circumference thereof, but to a circle or circles of which the diameter varies around the circumference within a range at which the flow of fluid is not affected.

Thus, the eccentric rotary valve according to the present invention is simple in structure compared with conventional conical plug valves.

DETAILED DESCRIPTION OF THE PREFERRED EMBODIMENTS

FIGS. 1-5 illustrate an eccentric rotary valve V embodying the present invention. The eccentric rotary valve V (which is a plug valve) includes a tubular valve body 1 made of cast steel through which a fluid w such as water flows. A valve shaft 2 made of cast steel is inserted in the valve body 1 such that its center axis a intersects the center axis o of the tubular shape of the valve body 1 (i.e., the center axis of the flow path of the valve body). The valve shaft 2 carries two valve elements (plugs) 3 made of cast steel and each having a valve element valve seat 3a which is brought into and out of contact with one of valve body valve seats 1a. The valve body 1 has an opening at its left-hand (in e.g., FIG. 1) side as a fluid inlet 4, and an opening at its right as a fluid outlet 5. The valve body 1 comprises two members having their perimeters fastened together by bolts, and including, respectively, the fluid inlet 4 and the fluid outlet 5.

The valve shaft 2 has one end (top end in FIG. 1) thereof protruding out of the valve body 1 so that the valve shaft 2 can be rotated by a handle, an actuator, or other means.

As seen in the direction of the center axis a of the valve shaft 2 (i.e., as seen in plan view), the valve elements 3 are symmetric with respect to the center axis a (which means that every part of each valve element 3 is at the same distance from the center axis a as the corresponding part of the other valve element 3 in the diametrically opposite direction). The valve elements 3 are integral with each other (see FIGS. 1 and 5), and define therebetween a through-passage 7 configured to communicate with the fluid inlet 4 and the fluid outlet 5. The fluid inlet 4, the fluid outlet 5, and the through-passage 7 are substantially equal in inner diameter. Further, the fluid inlet 4 and fluid outlet 5 are coaxial with each other, and the through-passage 7 can be moved to a position where it is coaxial with the fluid inlet 4 and fluid outlet 5.

Figure 3:
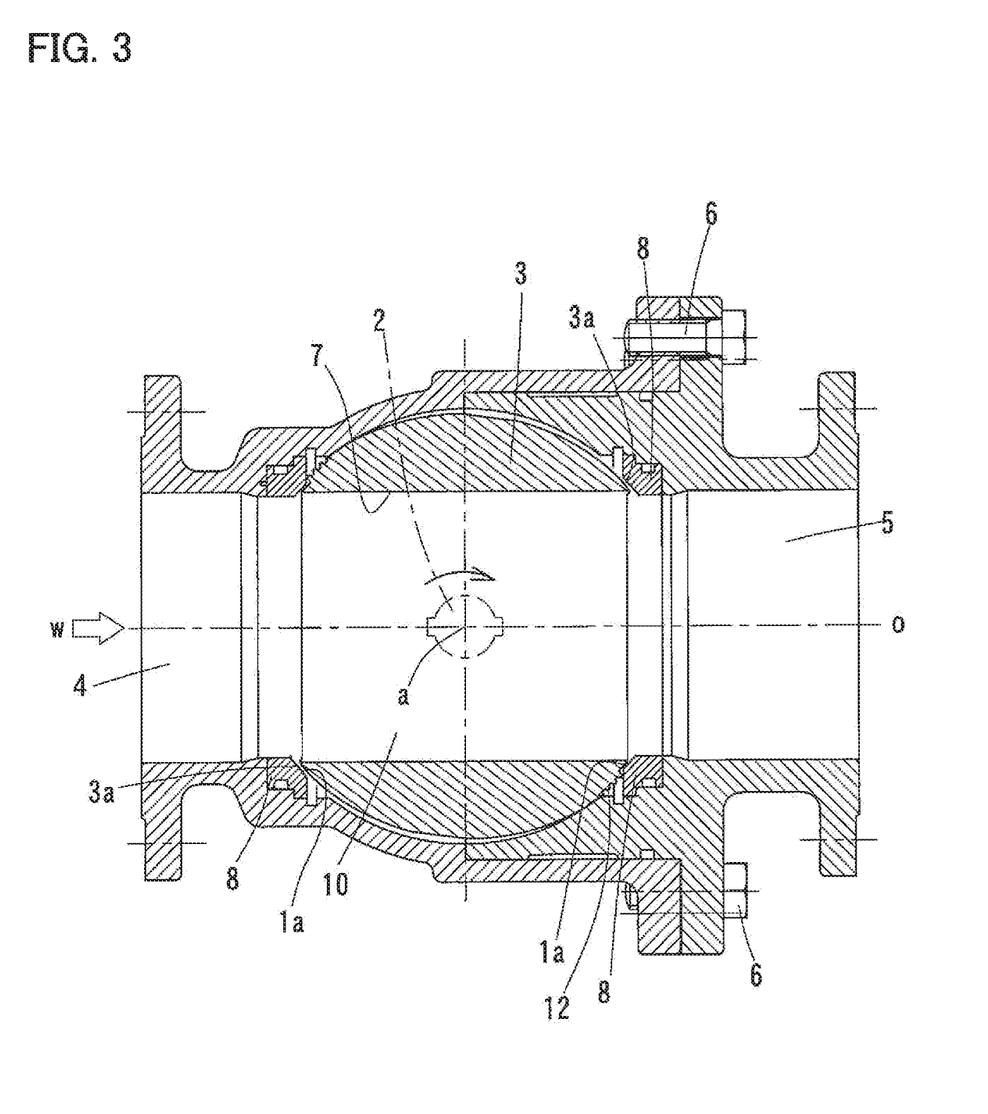
FIG. 3 is a sectional plan view of the embodiment of FIG. 1, showing the open position of the valve.
Figure 4:
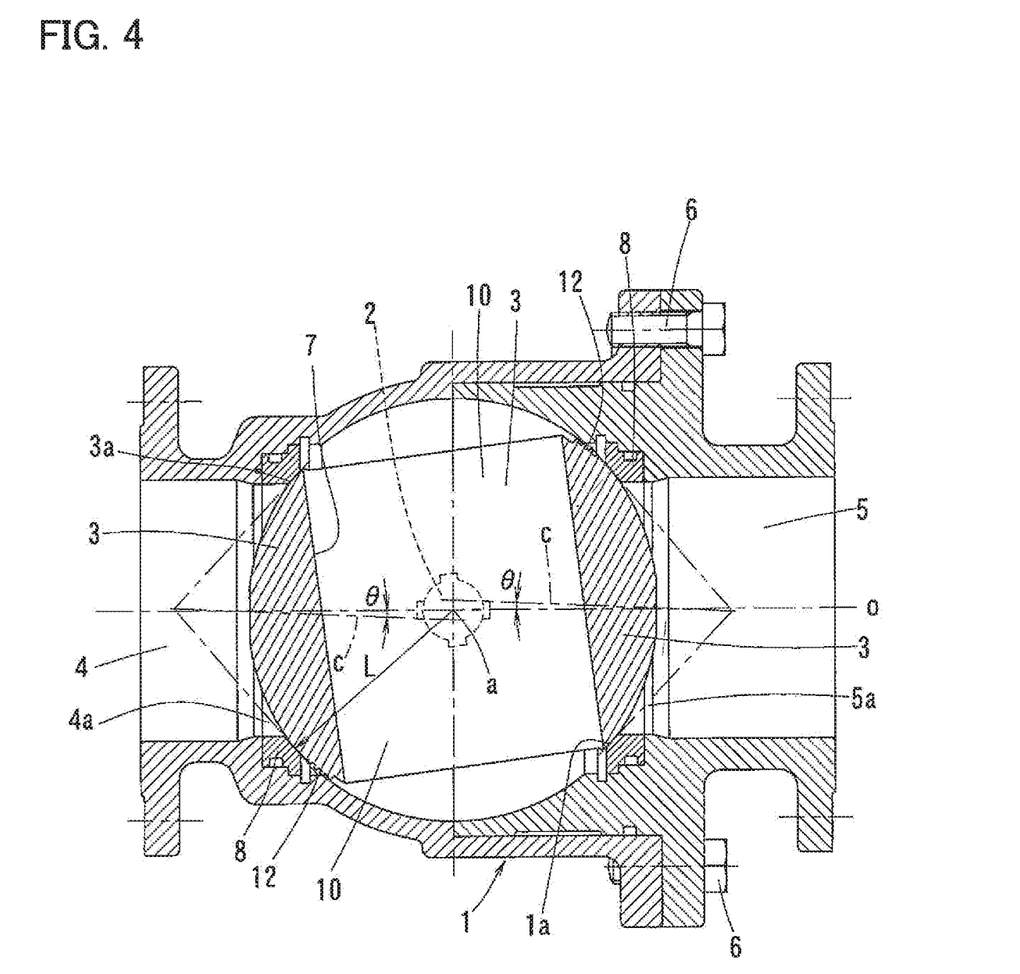
FIG. 4 illustrates the operation of the embodiment of FIG. 1.

Referring to FIG. 4, the valve elements 3 are mounted to the valve shaft 2 such that, with the eccentric rotary valve closed, the center axes c of the valve elements 3 (center axes of the (elliptic conical) valve element valve seats 3a) are inclined at predetermined angles θ relative to the center axis o of the valve body 1 in the valve closing direction shown by the arrow in FIG. 3 (i.e., such that the center axes c are offset from the center axis a of the valve shaft 2 in the valve closing direction). The center axes c of the elliptic cones of the valve body valve seats 1a are also inclined at the predetermined angles θ relative to the center axis o in the valve closing direction. Thus, when the valve is closed, the center axes c of the respective valve elements 3 (respective valve element valve seats 3a) substantially coincide with the center axes of the corresponding ones of the valve body valve seats 1a.

Each valve element valve seat 3a is integrally formed on a respective valve element 3 so as to be continuously and steplessly connected to an elliptic spherical surface of the valve element 3. The valve body valve seats 1a are located, respectively, at the fluid inlet 4 and the fluid outlet 5 of the valve body 1 such that the valve element valve seats 3a abut the corresponding valve body valve seats 1a. The valve body valve seats 1a are formed by seat rings 8 made of metal. Thus, as seen in plan view, the valve body valve seats 1a, as well as the valve element valve seats 3a, are symmetric with respect to the center axis a of the valve shaft 2, and the valve seats 1a and 3a form a metal seal structure.

With this eccentric rotary valve V, since, as described above, the valve body valve seats 1a are elliptic conical surfaces, and each valve element valve seat 3a, which is part of the surface of the valve element 3 and continuously and steplessly connected to the elliptic spherical surface of the valve element 3, is also an elliptic conical surface, the seal structure is such that the elliptic conical surfaces can be completely brought into surface contact (abutment) with each other.

As described above, with the valve seats 1a in contact with the valve seats 3a, the center axes c of the valve seats 1a and 3a are inclined at predetermined angles θ relative to the center axis o of the valve body, which means that the center axes c of the valve seats 1a and 3a do not lie on the center axis o of the valve body.

By selecting a suitable value as the predetermined angles θ of the valve body valve seats 1a and the valve element valve seats 3a, their abutment surfaces (valve holes 4a and 5a) form complete circles that lie on planes perpendicular to the center axis o of the valve body 1.

Flow regulating plates 10 are disposed between the valve elements 3 so as to extend in the direction of the flow of fluid through the through-passage 7. The number and thicknesses of the flow regulating plates 10, as well as the intervals therebetween, may be suitably determined e.g., based on experiments such that the flow regulating plates 10 do not hinder the flow of fluid. The flow regulating plates 10 enable smooth flow of fluid through the through-passage 7 (i.e., through the valve body 1), thereby improving controllability of the flow of fluid.

Figure 1:
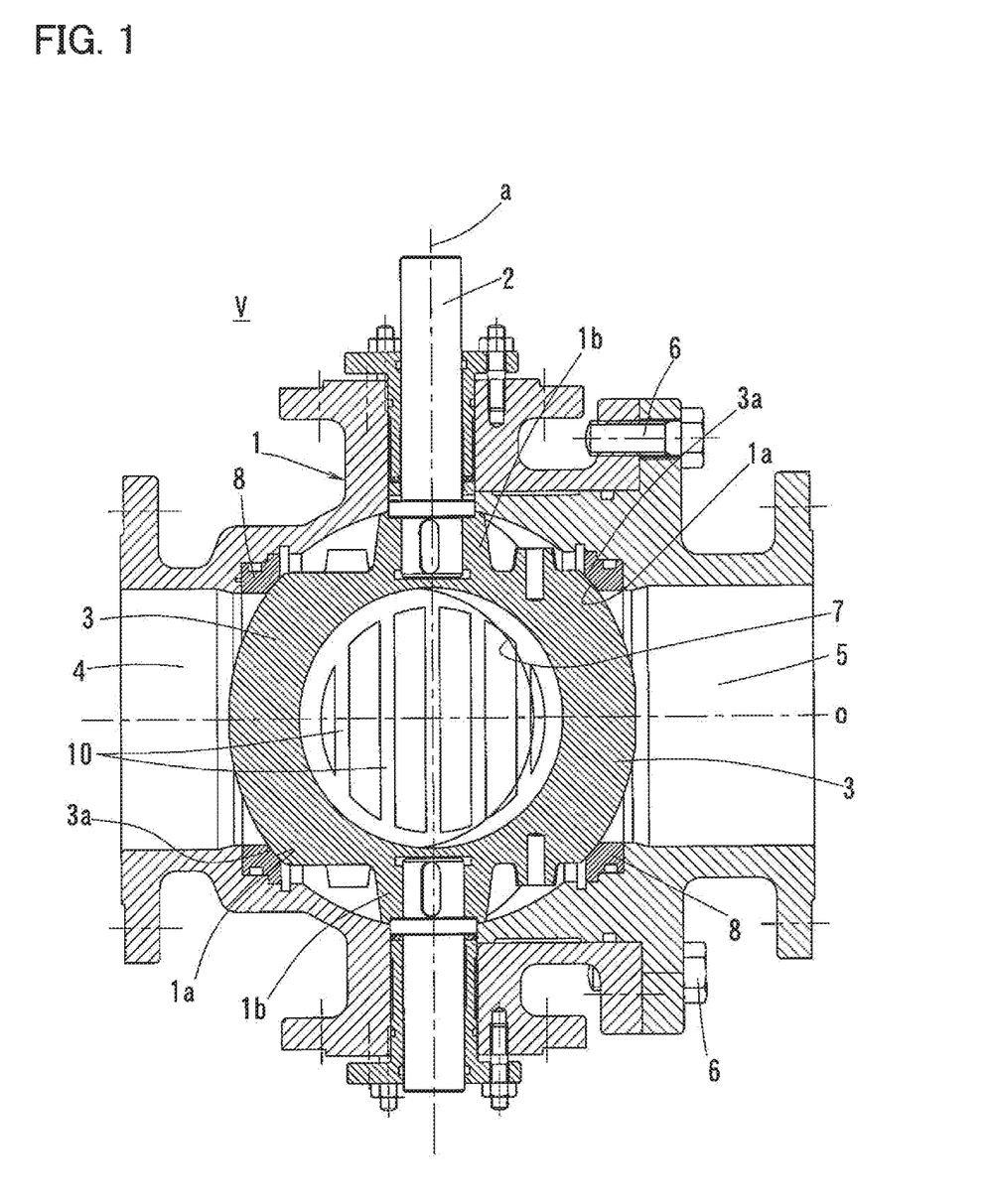
FIG. 1 is a sectional front view of an eccentric rotary valve embodying the present invention.
Figure 2:
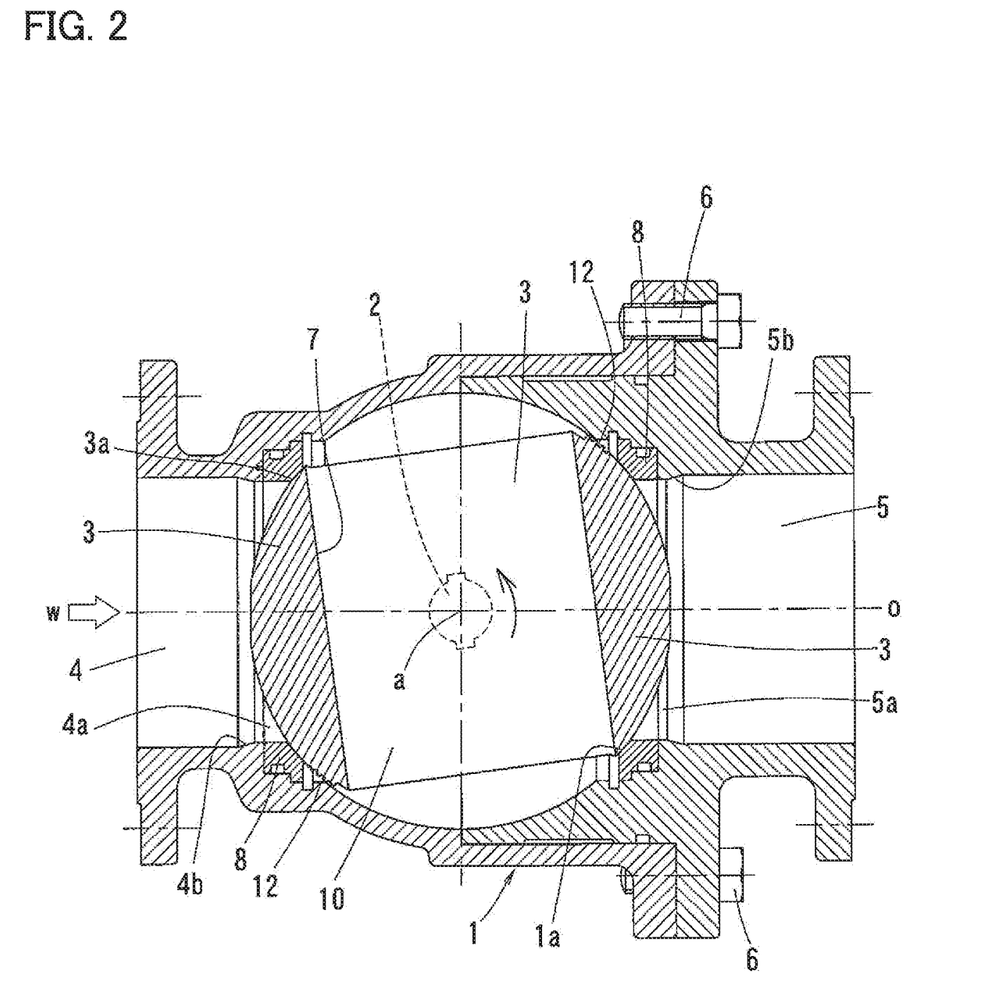
FIG. 2 is a sectional plan view of the embodiment of FIG. 1.

Ribs 11 are disposed on opposite sides of the valve shaft 2 at locations forwardly (in the valve opening direction shown by the arrow in FIG. 2 with the eccentric rotary valve closed as shown in FIG. 2) of the respective valve elements 3 so as to extend between valve shaft mounting portions 1b (shown in FIGS. 1 and 5) and so as to be adjacent, with the eccentric rotary valve open, to the respective valve body valve seats 1a. Each rib 11 is formed, in its surface, with grooves 12 extending in the circumferential direction of the valve body 1 (see FIG. 5).

With this arrangement, when the valve is opened, i.e. when the valve elements 3 are moved from the position of FIG. 2 to the position of FIG. 3 (in the direction of the arrow in FIG. 2), the forward (in the valve opening direction) portions of the valve bodies 3 are located close to the respective valve body valve seats 1a (see FIG. 3) so that the grooves 12 block and minimize the flow of fluid w from the fluid inlet 4 toward the fluid outlet 5 through the space around the valve elements 3. This in turn allows a larger amount of fluid to flow smoothly through the through-passage 7.

The number and the widths of the grooves 12, and the intervals therebetween may be appropriately determined e.g., based on experiments such that the grooves 12 can smoothly block the flow of fluid.

The eccentric rotary valve V of the embodiment is opened and closed by rotating the valve shaft 2, thereby bringing the valve seats 3a into and out of contact with the valve seats 1a.

With the eccentric rotary valve closed, i.e., with the valve holes 4a and 5a closed by the valve elements 3 as shown in FIGS. 1 and 2, when the valve elements 3 are turned by the valve shaft 2 in the direction of the arrow of FIG. 2, the abutment surfaces of the respective valve element valve seats 3a and the corresponding valve body valve seats 1a instantly separate from each other. This is because (i) the valve elements 3 are mounted to the valve shaft 2 such that, with the eccentric rotary valve closed, the center axes c of the valve bodies 3 (i.e., the center axes of the elliptic cones of the valve bodies) are, as shown in FIG. 4, inclined (offset) relative to the center axis o of the valve body 1 in the valve closing direction, and (ii) each valve element valve seat 3a is shaped and arranged such that the distance between its intermediate point in the rotational direction of the valve shaft and the center axis a of the valve shaft (distance indicated by the letter "L" in FIG. 4) is larger than the distance between the center axis a and any point of the valve element valve seat 3a forward or rearward (in the rotational direction) of the intermediate point.

Since the seal surfaces of the valve element valve seats 3a and the valve body valve seats 1a instantly separate from each other without sliding against each other, it is not necessary to raise the valve elements 3 beforehand, and also, it is possible to reduce the wear of the valve body 1 (valve seats 3a and 1a) to a bare minimum.

By turning the valve shaft 2 in the valve opening direction, the valve reaches the open position shown in FIG. 3, where the center axis of the through-passage 7 coincides with the center axis o of the valve body 1. The valve may be kept in the open position by arresting the rotation of the valve shaft 2 with a handle stopper or by computer control.

While the valve is open, the flow regulating plates 10 ensure a smooth flow of fluid through the through-passage 7, thus minimizing the amount of fluid flowing from the fluid inlet 4 toward the fluid outlet 5 through the space around the valve elements 3 (i.e., minimizing leakage of fluid). This in turn allows a larger amount of fluid w to flow smoothly through the through-passage 7.

Figure 5:
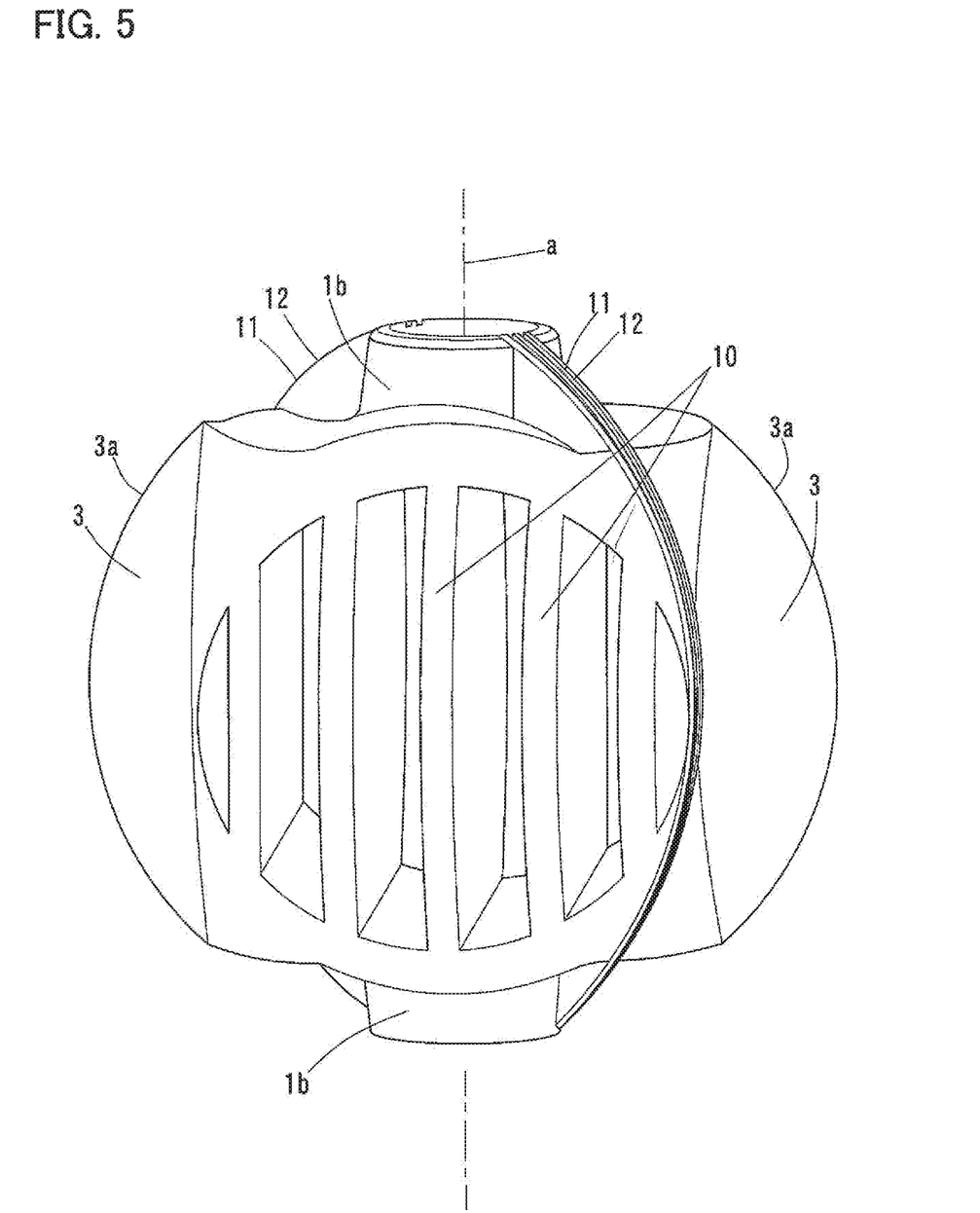
FIG. 5 is a perspective view of valve elements of the embodiment of FIG. 1.
Figure 6:
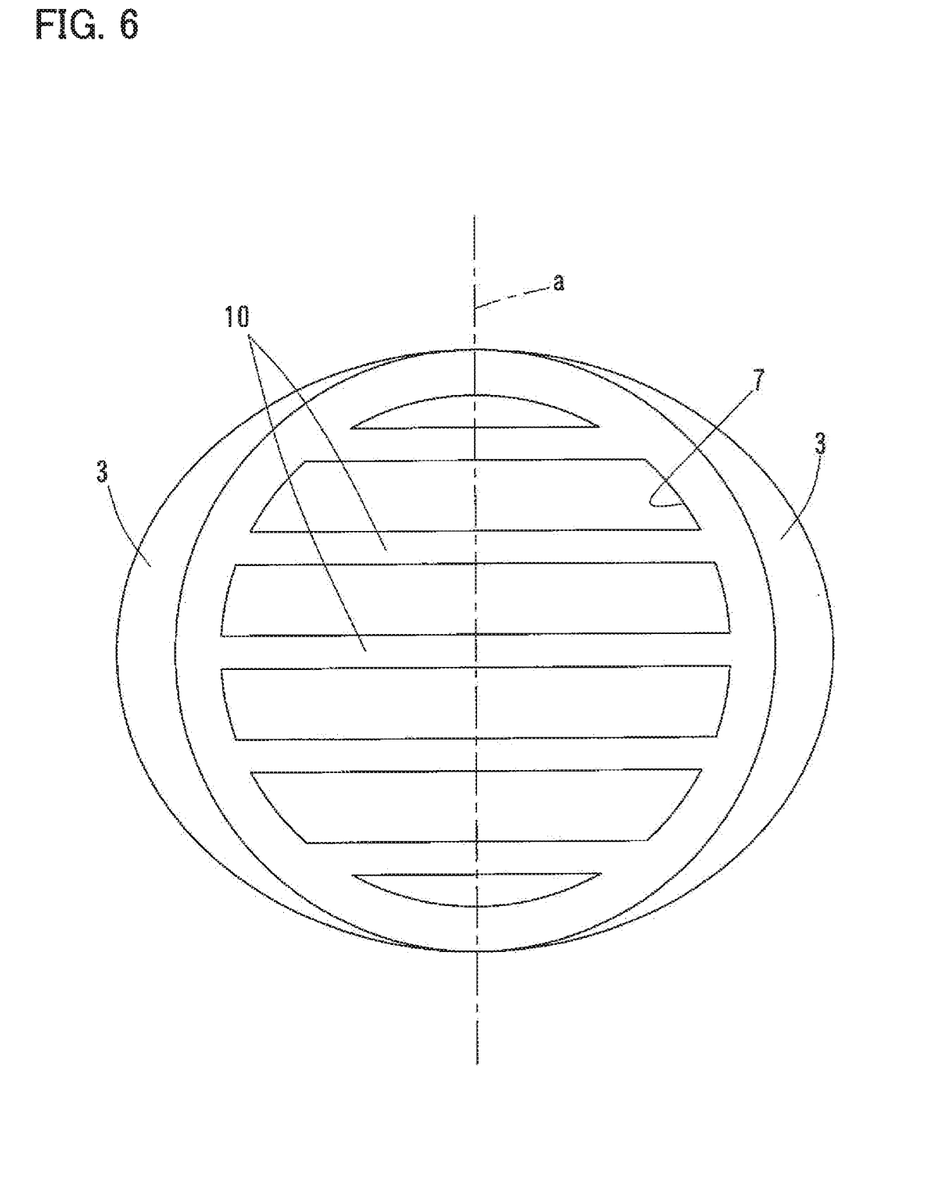
FIG. 6 is a front view of a portion of another embodiment of the present invention.

In FIG. 5, the flow regulating plates 10 are elongated in the axial direction a of the valve shaft 2, but, as shown in FIG. 6, the flow regulating plates 10 may be elongated in the direction perpendicular to the axial direction a of the valve shaft 2. Also, the flow regulating plates 10 may have a non-straight cross-section such as bellows-like (or zigzag) cross-section, provided the flow regulating plates 10 do not significantly hinder the flow of fluid.

In the embodiment, the valve elements 3 have elliptic spherical surfaces, but instead, the valve elements 3 may have elliptic conical surfaces or completely spherical surfaces. Irrespective of which of the above three surface shapes of the valve elements 3 are selected, any of the following three arrangements may be used, as long as the above-mentioned advantages of the present invention are achieved: (i) the valve element valve seats 3a and the valve body valve seats 1a are both elliptic spherical surfaces; (ii) the valve element valve seats 3a are elliptic spherical surfaces, while the valve body valve seats 1a are elliptic conical surfaces; and (iii) the valve element valve seats 3a and the valve body valve seats 1a are both elliptic conical surfaces. As the fluid w, water or gas, which may or may not contain minute particles, a special fluid such as a viscous fluid, and many other fluids can be used.

In the embodiment, the left-hand (in FIG. 2) opening of the valve body 1 is the fluid inlet 3 and the opening on the right is the fluid outlet 5, but instead, the left-hand opening may be the fluid outlet 5, and the right-hand opening may be the fluid inlet 4.

The above-described embodiment and modifications thereof are mere examples in every respect and should not be understood to limit the present invention. The scope of the present invention is shown by the accompanying claims, and should be understood to encompass every modification that is within the scope of the claims both literally and equivalently.

DESCRIPTION OF THE REFERENCE SYMBOLS

1: Valve body; 1a: Valve body valve seat; 1b: Valve shaft mounting portion; 2: Valve shaft; 3: Valve element; 3a: Valve element valve seat; 4: Fluid inlet (or fluid outlet) of the valve body; 4a: Valve hole adjacent to the fluid inlet (or fluid outlet); 5: Fluid outlet (or fluid inlet) of the valve body; 5a: Valve hole adjacent to the fluid outlet (or fluid inlet); 7: Through-passage; 10: Flow regulating plate; 11: Rib; 12: Groove; a: Center axis of the valve shaft; c: Center axis of a valve seat; o: Center axis of the (tubular) valve body; θ: Inclination angle of a valve seat; V: Eccentric rotary valve (plug valve)

What is claimed is:

1. An eccentric rotary valve comprising:
   a valve body tubular in shape and through which fluid can flow, the valve body having a fluid inlet and a fluid outlet;
   a valve shaft inserted in the valve body and having a center axis;
   a first valve element and a second valve element disposed on the valve shaft so as to be symmetrical to each other with respect to the center axis of the valve shaft, the first and second valve elements defining therebetween a through-passage configured to communicate with the fluid inlet and the fluid outlet of the valve body;
   a first valve body valve seat and a second valve body valve seat disposed in the valve body adjacent to the fluid inlet and the fluid outlet, respectively; and
   a first valve element valve seat and a second valve element valve seat disposed, respectively, on the first and second valve elements, and configured to abut, respectively, the first and second valve body valve seats,
   wherein each of the first and second valve elements has one of an elliptic spherical surface, an elliptic conical surface, and a completely spherical surface,
   wherein the first and second valve element valve seats and the first and second valve body valve seats are elliptic spherical surfaces made of metal and forming a metal seal structure,
   wherein the first and second valve element valve seats are continuously and steplessly connected, respectively, to the surfaces of the first and second valve elements, and
   wherein the first and second valve element valve seats and the first and second valve body valve seats have center axes, respectively, offset from the center axis of the valve shaft in a valve closing direction.

2. The eccentric rotary valve of claim 1, further comprising a first rib and a second rib disposed on opposite sides of the valve shaft at locations forwardly, in a valve opening direction with the eccentric rotary valve closed, of the first and second valve elements, respectively, so as to extend between valve shaft mounting portions to which the valve shaft is mounted and so as to be adjacent, with the eccentric rotary valve open, to the first and second valve body valve seats, respectively, and wherein each of the first and second ribs has a surface formed with a groove extending in a circumferential direction of the valve body.

3. The eccentric rotary valve of claim 1, wherein the center axes of the first and second valve body valve seats and the first and second valve element valve seats are inclined at predetermined angles relative to a center axis of the valve body such that, with the eccentric rotary valve closed, the first and second valve body valve seats are in contact with corresponding ones of the first and second valve element valve seats along complete circles that lie on planes perpendicular to the center axis of the valve body.

4. The eccentric rotary valve of claim 1, further comprising a flow regulating plate disposed between the first and second valve elements and extending in a fluid flow direction in the through-passage.

5. The eccentric rotary valve of claim 4, wherein the center axes of the first and second valve body valve seats and the first and second valve element valve seats are inclined at predetermined angles relative to a center axis of the valve body such that, with the eccentric rotary valve closed, the first and second valve body valve seats are in contact with corresponding ones of the first and second valve element valve seats along complete circles that lie on planes perpendicular to the center axis of the valve body.

6. The eccentric rotary valve of claim 4, further comprising a first rib and a second rib disposed on opposite sides of the valve shaft at locations forwardly, in a valve opening direction with the eccentric rotary valve closed, of the first and second valve elements, respectively, so as to extend between valve shaft mounting portions to which the valve shaft is mounted and so as to be adjacent, with the eccentric rotary valve open, to the first and second valve body valve seats, respectively, and wherein each of the first and second ribs has a surface formed with a groove extending in a circumferential direction of the valve body.

7. The eccentric rotary valve of claim 6, wherein the center axes of the first and second valve body valve seats and the first and second valve element valve seats are inclined at predetermined angles relative to a center axis of the valve body such that, with the eccentric rotary valve closed, the first and second valve body valve seats are in contact with corresponding ones of the first and second valve element valve seats along complete circles that lie on planes perpendicular to the center axis of the valve body.

8. An eccentric rotary valve comprising:
a valve body tubular in shape and through which fluid can flow, the valve body having a fluid inlet and a fluid outlet;
a valve shaft inserted in the valve body and having a center axis;
a first valve element and a second valve element disposed on the valve shaft so as to be symmetrical to each other with respect to the center axis of the valve shaft, the first and second valve elements defining therebetween a through-passage configured to communicate with the fluid inlet and the fluid outlet of the valve body;
a first valve body valve seat and a second valve body valve seat disposed in the valve body adjacent to the fluid inlet and the fluid outlet, respectively; and
a first valve element valve seat and a second valve element valve seat disposed, respectively, on the first and second valve elements, and configured to abut, respectively, the first and second valve body valve seats,
wherein each of the first and second valve elements has one of an elliptic spherical surface, an elliptic conical surface, and a completely spherical surface,
wherein the first and second valve element valve seats and the first and second valve body valve seats are made of metal and forming a metal seal structure, with the first and second valve element valve seats being elliptic spherical surfaces, and the first and second valve body valve seats being elliptic conical surfaces,
wherein the first and second valve element valve seats are continuously and steplessly connected, respectively, to the surfaces of the first and second valve elements, and
wherein the first and second valve element valve seats and the first and second valve body valve seats have center axes, respectively, offset from the center axis of the valve shaft in a valve closing direction.

9. The eccentric rotary valve of claim 8, wherein the center axes of the first and second valve body valve seats and the first and second valve element valve seats are inclined at predetermined angles relative to a center axis of the valve body such that, with the eccentric rotary valve closed, the first and second valve body valve seats are in contact with corresponding ones of the first and second valve element valve seats along complete circles that lie on planes perpendicular to the center axis of the valve body.

10. The eccentric rotary valve of claim 8, further comprising a flow regulating plate disposed between the first and second valve elements and extending in a fluid flow direction in the through-passage.

11. The eccentric rotary valve of claim 10, wherein the center axes of the first and second valve body valve seats and the first and second valve element valve seats are inclined at predetermined angles relative to a center axis of the valve body such that, with the eccentric rotary valve closed, the first and second valve body valve seats are in contact with corresponding ones of the first and second valve element valve seats along complete circles that lie on planes perpendicular to the center axis of the valve body.

12. The eccentric rotary valve of claim 8, further comprising a first rib and a second rib disposed on opposite sides of the valve shaft at locations forwardly, in a valve opening direction with the eccentric rotary valve closed, of the first and second valve elements, respectively, so as to extend between valve shaft mounting portions to which the valve shaft is mounted and so as to be adjacent, with the eccentric rotary valve open, to the first and second valve body valve seats, respectively, and wherein each of the first and second ribs has a surface formed with a groove extending in a circumferential direction of the valve body.

13. The eccentric rotary valve of claim 10, further comprising a first rib and a second rib disposed on opposite sides of the valve shaft at locations forwardly, in a valve opening direction with the eccentric rotary valve closed, of the first and second valve elements, respectively, so as to extend between valve shaft mounting portions to which the valve shaft is mounted and so as to be adjacent, with the eccentric rotary valve open, to the first and second valve body valve seats, respectively, and wherein each of the first and second ribs has a surface formed with a groove extending in a circumferential direction of the valve body.

14. The eccentric rotary valve of claim 13, wherein the center axes of the first and second valve body valve seats and the first and second valve element valve seats are inclined at predetermined angles relative to a center axis of the valve body such that, with the eccentric rotary valve closed, the first and second valve body valve seats are in contact with corresponding ones of the first and second valve element valve seats along complete circles that lie on planes perpendicular to the center axis of the valve body.

15. An eccentric rotary valve comprising:
a valve body tubular in shape and through which fluid can flow, the valve body having a fluid inlet and a fluid outlet;
a valve shaft inserted in the valve body and having a center axis;
a first valve element and a second valve element disposed on the valve shaft so as to be symmetrical to each other with respect to the center axis of the valve shaft, the first and second valve elements defining therebetween a through-passage configured to communicate with the fluid inlet and the fluid outlet of the body;
a first valve body valve seat and a second valve body valve seat disposed in the valve body adjacent to the fluid inlet and the fluid outlet, respectively; and
a first valve element valve seat and a second valve element valve seat disposed, respectively, on the first and second valve elements, and configured to abut, respectively, the first and second valve body valve seats,
wherein each of the first and second valve elements has a surface comprising an elliptic spherical surface,
wherein the first and second valve element valve seats and the first and second valve body valve seats are elliptic conical surfaces made of metal and forming a metal seal structure,
wherein the first and second valve element valve seats are continuously and steplessly connected, respectively, to the surfaces of the first and second valve elements, and
wherein the first and second valve element valve seats and the first and second valve body valve seats have center axes, respectively, offset from the center axis of the valve shaft in a valve closing direction.

16. The eccentric rotary valve of claim 15, further comprising a first rib and a second rib disposed on opposite sides of the valve shaft at locations forwardly, in a valve opening direction with the eccentric rotary valve closed, of the first and second valve elements, respectively, so as to extend between valve shaft mounting portions to which the valve shaft is mounted and so as to be adjacent, with the eccentric rotary valve open, to the first and second valve body valve seats, respectively, and wherein each of the first and second ribs has a surface formed with a groove extending in a circumferential direction of the valve body.

17. The eccentric rotary valve of claim 15, wherein the center axes of the first and second valve body valve seats and the first and second valve element valve seats are inclined at predetermined angles relative to a center axis of the valve body such that, with the eccentric rotary valve closed, the first and second valve body valve seats are in contact with corresponding ones of the first and second valve element valve seats along complete circles that lie on planes perpendicular to the center axis of the valve body.

18. The eccentric rotary valve of claim 15, further comprising a flow regulating plate disposed between the first and second valve elements and extending in a fluid flow direction in the through-passage.

19. The eccentric rotary valve of claim 18, further comprising a first rib and a second rib disposed on opposite sides of the valve shaft at locations forwardly, in a valve opening direction with the eccentric rotary valve closed, of the first and second valve elements, respectively, so as to extend between valve shaft mounting portions to which the valve shaft is mounted and so as to be adjacent, with the eccentric rotary valve open, to the first and second valve body valve seats, respectively, and wherein each of the first and second ribs has a surface formed with a groove extending in a circumferential direction of the valve body.

20. The eccentric rotary valve of claim 18, wherein the center axes of the first and second valve body valve seats and the first and second valve element valve seats are inclined at predetermined angles relative to a center axis of the valve body such that, with the eccentric rotary valve closed, the first and second valve body valve seats are in contact with corresponding ones of the first and second valve element valve seats along complete circles that lie on planes perpendicular to the center axis of the valve body.

* * * * *